United States Patent [19]

Knott

[11] Patent Number: 4,925,136

[45] Date of Patent: May 15, 1990

[54] PIPE SUPPORT APPARATUS AND/OR METHODS OF SUPPORTING PIPES

[75] Inventor: Frederick J. Knott, Auckland, New Zealand

[73] Assignee: Frank George Grundman, La Jolla, Calif.

[21] Appl. No.: 216,272

[22] Filed: Jul. 8, 1988

[30] Foreign Application Priority Data

Sep. 22, 1987 [NZ] New Zealand .................. 221896

[51] Int. Cl.$^5$ .............................................. F16L 3/12
[52] U.S. Cl. ....................................... 248/62; 248/74.3
[58] Field of Search .................. 248/58, 59, 62, 60, 248/65, 67.7, 68.1, 70, 74.1, 74.3, 317, 327; 24/16 PB, 17 A, 17 B, 17 AP, 19, 68 PP, 68 C, 339, 457, 458

[56] References Cited

U.S. PATENT DOCUMENTS

| | | | |
|---|---|---|---|
| 2,161,782 | 6/1939 | Flower | 248/59 |
| 2,440,469 | 4/1948 | Goddard | 248/68.1 |
| 2,605,387 | 7/1952 | Brodie | 248/62 |
| 3,188,138 | 6/1965 | Lockshin | 24/339 |
| 3,334,851 | 8/1967 | Cassidy | 248/62 |
| 3,353,774 | 11/1967 | Thomas | 248/68.1 |
| 3,486,275 | 12/1969 | Hidassy | 248/68.1 |
| 4,020,531 | 5/1977 | Ahrens | 24/458 |

FOREIGN PATENT DOCUMENTS

| | | | |
|---|---|---|---|
| 1099326 | 9/1955 | France | 24/339 |
| 2326606 | 4/1977 | France | 248/68.1 |
| 993812 | 5/1948 | New Zealand . | |
| 107132 | 3/1952 | New Zealand . | |
| 1106512 | 11/1953 | New Zealand . | |
| 117626 | 2/1958 | New Zealand . | |
| 128411 | 3/1963 | New Zealand . | |
| 135055 | 1/1967 | New Zealand . | |
| 136429 | 6/1967 | New Zealand . | |
| 165664 | 4/1975 | New Zealand . | |
| 165912 | 7/1975 | New Zealand . | |
| 182453 | 1/1983 | New Zealand . | |
| 739761 | 1/1980 | U.S.S.R. | 24/457 |
| 1321981 | 7/1987 | U.S.S.R. | 248/58 |

Primary Examiner—Ramon O. Ramirez
Assistant Examiner—Robert A. Olson
Attorney, Agent, or Firm—Fleit, Jacobson, Cohn, Price, Holman & Stern

[57] ABSTRACT

A pipe support apparatus for supporting one or more horizontally extending pipes of identical or disparate diameters includes an abutment means and at least one elongate retaining means. In use, a pipe or pipes together with the retaining means is positioned so that the pipe is abutted to the abutment means at a point lower than the vertical midpoint of the pipe, and is retained in position by the retaining means. In a preferred embodiment, a support member is provided to attach the apparatus to a desired surface, and the apparatus also includes a bracket member to aid in positioning the pipe or pipes. A method of supporting one or more pipes is also provided.

7 Claims, 1 Drawing Sheet

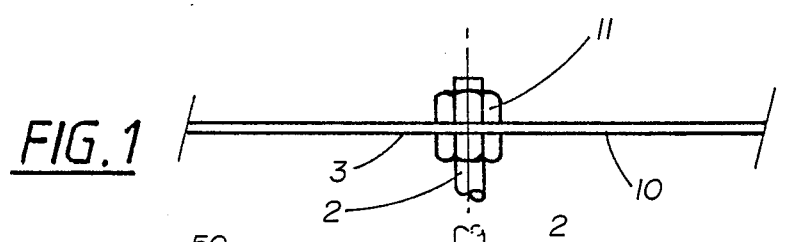
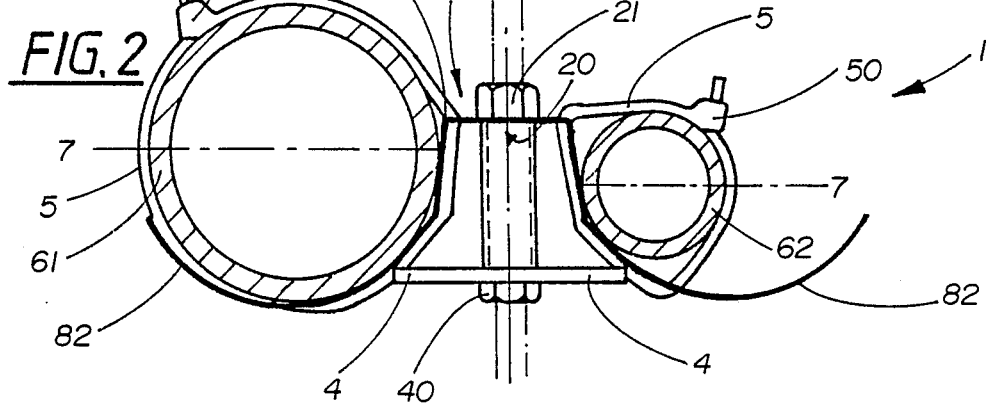
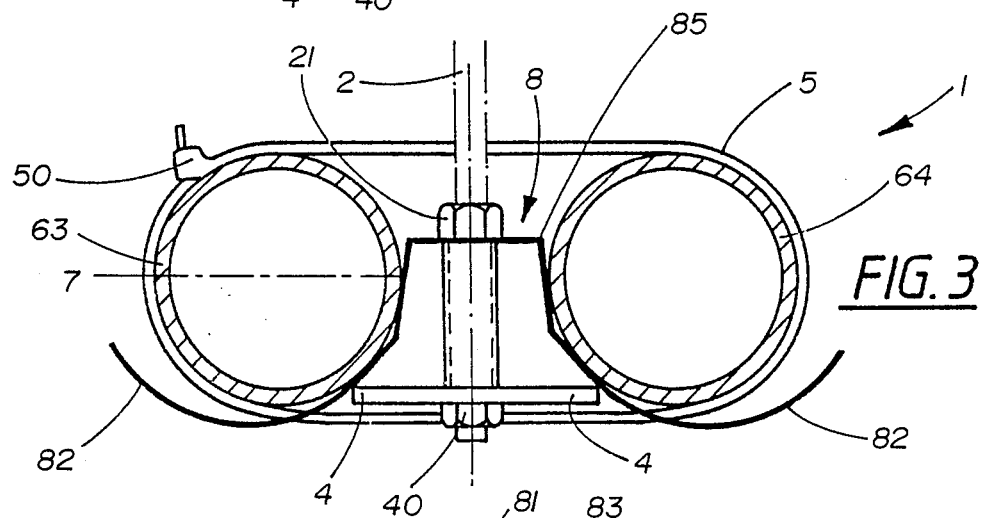
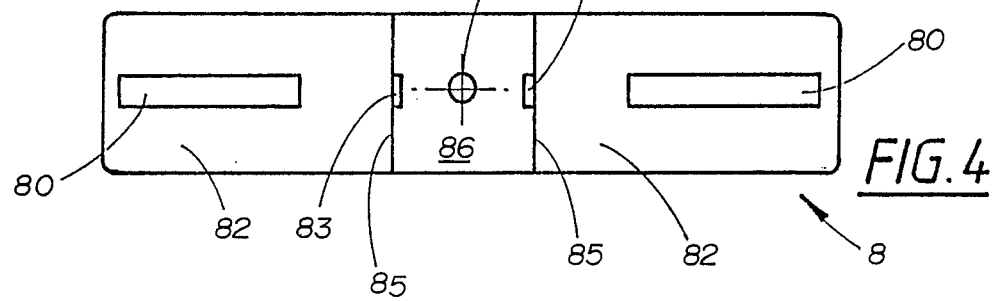

PIPE SUPPORT APPARATUS AND/OR METHODS OF SUPPORTING PIPES

This invention relates to pipe support apparatus and/or methods of supporting pipes.

Various methods of supporting pipes, of the kind which carry for example water in domestic or industrial applications are known, but these generally suffer from disadvantages such as that they can hold only one pipe at a time, it may be difficult to engage the pipe or pipes with the support and/or the support is not readily able to be used with a range of pipes of different sizes.

It is an object of the present invention to provide a pipe support apparatus and/or a method of supporting pipes which will obviate some or all of the preceding disadvantages, and/or which will at least provide the public with a useful choice.

Accordingly in one aspect the invention consists in a pipe support apparatus comprising: abutment means; and an elongate retaining means; so that in use at least one horizontally extending pipe together with said retaining means is positioned so that said pipe is abutted to said abutment means at a point lower than the vertical mid-point of said pipe, and is retained in position by said retaining means.

In a further aspect the invention consists in a method of supporting a horizontally extending pipe, by means of abutment means and an elongate retaining means; comprising positioning said pipe so that said pipe abuts said abutment means at a point lower than the vertical mid-point of said pipe and arranging said retaining means about said pipe so as to retain said pipe in position.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only. One preferred form of the invention will now be described with reference to the accompanying drawings, in which;

FIG. 1 shows an example of attachment means for attaching pipe support apparatus according to the invention to a desired surface;

FIGS. 2 and 3 show elevations of pipe support apparatus in accordance with the invention, with different combinations of pipes supported by the invention shown in cross section; and FIG. 4 shows a plan view of a bracket member included in the pipe support apparatus of FIGS. 2 and 3. Thus with reference now to the figures in accordance with the invention a pipe support apparatus 1 is provided comprising: abutment means 4 and an elongate retaining means 5; so that in use at least one horizontally extending pipe 61 together with retaining means 5 is positioned so that the pipe 61 abuts abutment means 4 at a point lower than the vertical mid-point 7 of the pipe 61, and the pipe is retained in position by the retaining means 5.

The pipe support apparatus 1 preferably supports at least two pipes 61, 62, and is preferably substantially bilaterally symmetrical about the support member 2.

The pipe support apparatus 1 preferably includes a bracket member 8 engaged with the support member 2, and in use extending at least partly underneath and in contact with the pipe or pipes 61, 62 so as to aid in positioning the pipes.

In use a support member 2 will be provided having attachment means 3, displaced from the projecting abutment means 4, to attach the apparatus, when engaged with the support member, to a desired surface.

The support member 2 preferably comprises a substantially vertically extending shaft member. For example, the support member 2 may comprise an externally threaded bar of for example steel, or another suitable material, the screw threading extending to the upper end so as to comprise attachment means 3 which may be attached to a desired surface 10 for example by passing the end of member 2 through an aperture in the surface and locking it by means of locking nut 11 or any other suitable fastening means, or for example member 2 could be connected to a bracket attached to the surface 10.

Abutment means 4 in the preferred form comprises a washer or the like fastened to the support member 2 by a locking nut 40.

The retaining means 5 preferably comprises an elongate strap including fastening means 50 such as a buckle or clip enabling the strap 5 to be fastened to itself so as to in use form a closed curve encircling the pipe 61 and in at least partial contact therewith. Preferably, a plurality of pipes 61, 62 are in use positioned so as to be supported by the abutment means 4 and by the retaining means 5, the retaining means 5 being arranged so as to laterally encircle the sum of the pipes 61, 62, for example by being fastened to itself by way of fastening means 50, as shown in FIGS. 1 and 2.

Bracket member 8 comprises in the preferred form a shaped panel of for example steel or another suitable material which is adapted to be engaged with the support member 2, for example by way of an aperture at the point of engagement 81 which is passed over the support member 2 and is of a suitable size to allow the bracket member 8 to be seated on a seating flange or enlargement 20 and may be held in place by for example a nut 21 as shown in FIG. 1. Member 8 may suitably be wing shaped including extending flanges 82 which in use pass underneath and in contact with the supported pipes 61, 62 to aid in positioning the pipes during arrangement of the pipe support apparatus.

The bracket member 8 preferably includes apertures 80 and 83. In the preferred form shown, aperture 80 is an elongated slot distal from the point of engagement 81 of the bracket member 8 with the support member 2 and aperture 83 is a smaller aperture somewhat nearer to the point of engagement 81. Both apertures 80 and 83 are dimensioned to allow the passage of retaining means 5 in use.

In the preferred, wing-shaped configuration of the bracket member 8 illustrated, smaller apertures 83 are at or adjacent the corners 85 of the bracket member 8 where the engagement portion 86 becomes the downward and outwardly extending flange 82. The elongated apertures 80 are positioned in the extending flanges 82.

It will be apparent that a number of abutments could be provided on a single support member, for example, stacked one above the other, so as to support a plurality of vertically as well as horizontally adjacent pipes.

The use of the invention will now be described.

In use the pipe 61 and the retaining means 5 are positioned so that the pipe 61 is supported by the abutment means 4 at a point lower than the vertical mid-point 7 of the pipe 61, and is further supported by the retaining means 5. Preferably the positioning step includes arranging the retaining means 5 so as to form a closed curve encircling the pipe 61 and in at least partial contact therewith.

FIG. 2 illustrates a particular preferred method of using the apparatus according to the invention in order to support a pair of adjacent horizontally extending pipes 61 and 62 of unequal diameter. Each pipe is separately positioned so as to abut the abutment means 4 at a point lower than the midpoint of the pipe. This positioning stage is facilitated by the bracket member 8 in which the pipes can initially rest during positioning. For each pipe, a retaining means 5, here a strap, is threaded through apertures 80 and 83 and arranged around the pipe 61 or 62 so as to form a closed curve encircling the pipe 61 or 62 and in at least partial contact therewith. The retaining means 5 is pulled substantially tight so as to retain the pipe in each case in abutment with the abutment means 4, and means 5 is fastened to itself by way of fastening means 50.

Clearly the point at which the retaining means 5 passes through the elongated aperture 80 on each side will depend on the particular diameter of the pipe which is being supported. The elongated shape of each aperture 80 can allow a range of pipe diameters to be accommodated FIG. 3 illustrates a particular preferred method of using the apparatus according to the invention to support a pair of adjacent horizontally extending pipes 63 and 64 of approximately or exactly equal diameters. In this case the pipes 63 and 64 are positioned as previously described to abut abutment means 4, preferably employing the bracket member 8, and are retained in position by a single retaining means 5 which passes through both apertures 80 and encircles the sum of the pipes 63 and 64, in partial contact with each.

Thus it can be seen that according to the invention a pipe support apparatus and/or a method of supporting pipes is provided which can be readily applied to the support of laterally extending pipes which may vary in size, desired distance from the surfaces of attachment, and number. The elements of the apparatus according to the invention may be readily produced in quantity, and in a variety of sizes suitable for use with various sizes and configurations of pipes. In the preferred form shown the pipe support apparatus may be particularly suitable for supporting a pair of laterally adjacent pipes which may serve to balance each others weight when supported together by the support apparatus of the invention, so as to increase the strength and stability offered by the support method and/or apparatus in use. The bracket member which may be provided in accordance with the invention can advantageously serve to provide some support and/or aid in positioning of the pipes while the pipe support apparatus is being arranged. If a bracket member is provided, the apertures described in the preferred form of the invention can allow the retaining means strap to be positioned in suitably firm contact with the supported pipes. The pipe support apparatus according to the invention is advantageously able to be attached to the desired surface in a variety of ways according to the particular surface by the provision of various attachment means, and since it is displaced from the point of support of the pipes interference with the arrangement of the pipe or pipes can be reduced or avoided.

What is claimed is:

1. A pipe support apparatus, comprising:
    a substantially vertical support member;
    a substantially horizontally extending bracket member including a horizontal, planar portion with means to engage with said support member, said bracket member having at least one curved wing portion extending downwardly and curvilinearly away from an end of said planar portion;
    load-bearing abutment means including at least one substantially planar flange extending substantially horizontally from said support member at a point displaced from the point of engagement of said bracket member with said support member whereby the end of said flange distal from said support member abuts an under surface of said wing portion of said bracket member and provides load-bearing support therefor at a point displaced from said support member.

2. The pipe support apparatus as claimed in claim 1, further comprising adjustable attachment means for attaching said abutment means and said bracket member to said support member, whereby the vertical position of said abutment means and said bracket member may be adjusted over a substantially continuous range of positions with respect to said support member while one or more pipes are supported by said apparatus.

3. The pipe support apparatus as claimed in claim 1, further comprising securing means provided on said support member for securing said support member to a desired surface.

4. The pipe support apparatus according to claim 1, wherein a pair of said wing portions on opposite sides of the planar portion are provided.

5. The pipe support apparatus according to claim 1, which includes load-bearing elongated retaining means for retaining at least one pipe and supporting said at least one pipe in contact with said bracket member, wherein said bracket member is provided with apertures therein whereby said retaining means may be engaged with said bracket member.

6. The pipe support apparatus as claimed in claim 5, wherein said abutment means is abutted to said wing portion at a relatively low position on said wing portion such that a pipe retained in contact with said bracket member by said elongate retaining means may be supported by said abutment means at a point lower than a vertical midpoint of said pipe.

7. The pipe support apparatus as claimed in claim 5, wherein at least one of said apertures in said bracket member is slot-like and extends along a substantial portion of the length of the wing portion, whereby said elongate retaining means may be passed through said wing portion at a continuous range of positions on said bracket member in accordance with the diameter of a pipe to be supported by the apparatus.

* * * * *